J. W. GABLE.
SELF LOCKING DAMPER REGULATOR.
APPLICATION FILED JUNE 9, 1920.
1,397,953.
Patented Nov. 22, 1921.
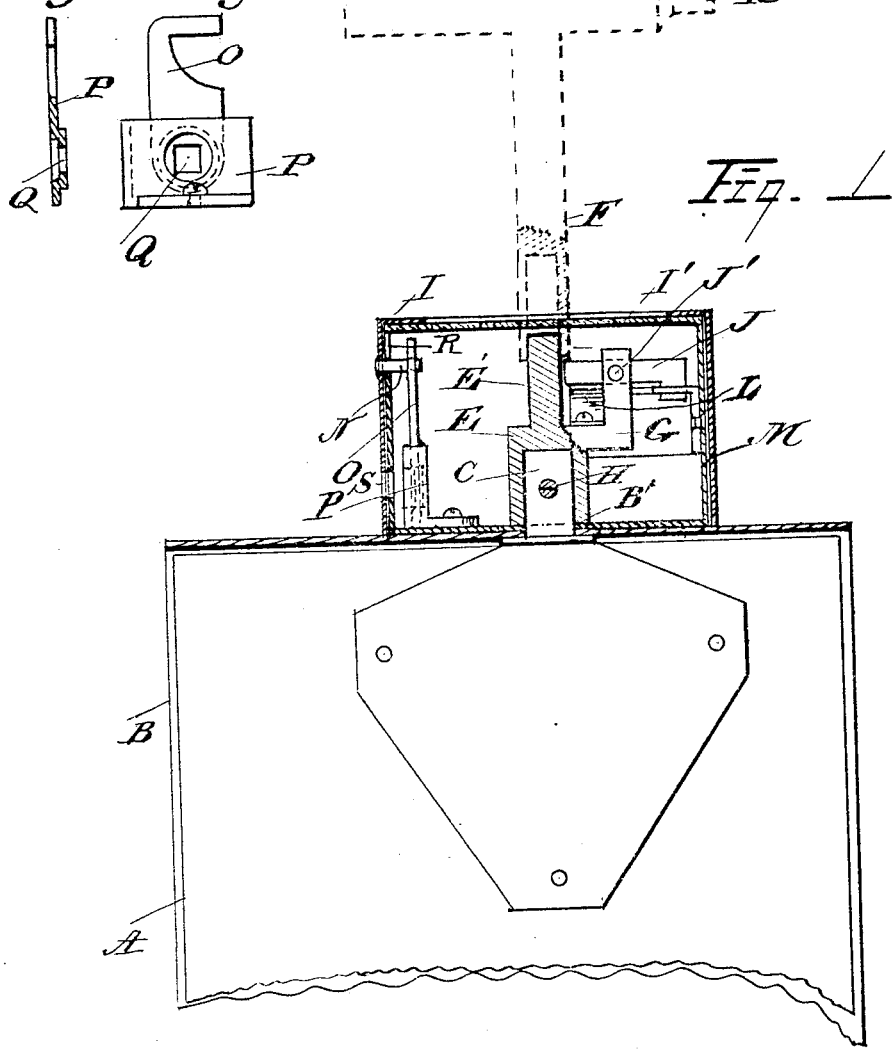
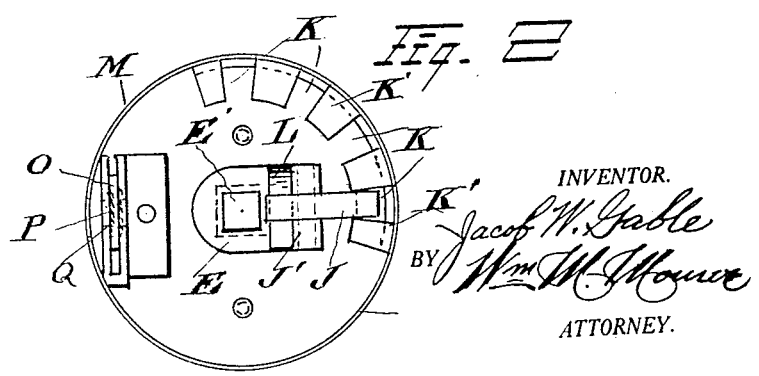
INVENTOR.
Jacob W. Gable
BY
ATTORNEY.

UNITED STATES PATENT OFFICE.

JACOB W. GABLE, OF CLEVELAND, OHIO, ASSIGNOR OF TWO-THIRDS TO ARTHUR COUGHLIN AND BLAIN DUNCAN, AND ONE-THIRD TO A. W. HUTTON AND P. D. ASTRY, ALL OF CLEVELAND, OHIO.

SELF-LOCKING DAMPER-REGULATOR.

1,397,953.        Specification of Letters Patent.        Patented Nov. 22, 1921.

Application filed June 9, 1920. Serial No. 387,667.

*To all whom it may concern:*

Be it known that I, JACOB W. GABLE, a citizen of the United States, and resident of Cleveland, in the county of Cuyahoga and State of Ohio, have invented certain new and useful Improvements in Self-Locking Damper-Regulators, of which I hereby declare the following to be a full, clear, and exact description, such as will enable others skilled in the art to which it appertains to make and use the same.

The object of the invention is to regulate and lock the damper of heating and ventilating systems for buildings so that when installed the desired amount of fresh or hot air will be delivered to each room or hall, and the regulating damper therefor can not be tampered with by irresponsible persons, and a key will be provided and placed in the hands of the person in charge of the system, who will be the only one able to effect any alterations in the air supply to any portion of the building.

The invention comprises mechanism cooperating with the damper for positioning it at any desired angle in the air supply pipe, and means for retaining it in the desired position.

It includes also an inclosure for the engaging parts of the damper and retaining means therefor, and a detachable cover for the inclosure, which prevents access to and movement of the damper-retaining mechanism.

It also includes locking means for the cover, and a key constructed and arranged to penetrate the cover and release the locking mechanism therefor, and also adapted to disengage the locking means for the damper and to rotate the damper to adjust it to any required position.

The invention is hereinafter further described, illustrated in the accompanying drawing, and specifically pointed out in the claims.

In the accompanying drawing, Figure 1, is a vertical central section of the casing, inclosing the stem of the damper and the locking device. Fig. 2 is a plan of the casing with the cover removed. Fig. 3 is a detail of the locking device for the cover. Fig. 3ª is a section thereof.

In Fig. 1 there are shown a portion of a damper, A, and a portion of a pipe, B, the portion of the damper shown having a stem, C, projecting through the portion of pipe shown. A socket piece, E, engages the stem C and has a squared projection E', which forms in effect an extension of the stem C and is adapted to be engaged by a key, F, shown in dotted lines in Fig. 1. The socket piece has an arm, G, projecting therefrom, and is secured to the stem, C, by means of the pin, H. A cylindrical casing, M, incloses the mechanism. This casing is open at the outer end.

I is the cover, provided with glass insertion, I', through which the position of the damper, as indicated by the position of the arm G, can be seen. A pawl J is pivoted intermediate of its ends at J' in the aforesaid arm and the outer end of this pawl normally engages one of the radial slots, K, between projections, K', K', on the inner wall of the casing. A spring L makes this engagement positive.

When the key is moved downward over the extension of the stem it will depress the inner end of the pawl and raise the outer end of the radial slot K between projections K' which will permit the key to turn the stem and damper to any position required.

When the key is removed, the spring L returns the pawl into engagement between projections K', K'.

To prevent irresponsible persons from tampering with the lock and turning the damper, the mechanism is inclosed by a detachable cover, I, which is locked at the side in such a manner that only the caretaker will understand the manner of releasing the cover.

In this device the cover is provided with an inwardly extending pin N, over which a latch, O, falls when the cover is pressed down upon the casing. When the cover, I, is moved into or out of place the pin, N, moves through slot, R, in the casing, M.

The latch is pivoted upon a double bearing P and is provided with an angular opening Q in the pivotal part through which a squared member R upon the key is passed. An opposite hole S in the casing admits the key.

Having described the invention, what I claim as new and desire to secure by Letters Patent is:

1. The combination of a pipe and a damper revoluble therein, the damper having a stem projecting through the side of the pipe and adapted to be engaged by a key, a casing projecting from the side of the pipe and surrounding the stem, a rack fixed within the casing, an arm projecting from the stem, and an elongated pawl pivoted to the arm with one end in operative relation to the rack and the other end adjacent the stem in such a position that the key in engaging the stem will move the pawl to inoperative position.

2. The combination of a pipe and a damper revoluble therein, the damper having a stem projecting through the side of the pipe and adapted to be engaged by a key, a casing projecting from the side of the pipe and surrounding the stem, a rack fixed within the casing, an arm projecting from the stem, and an elongated pawl pivoted to the arm with one end in operative relation to the rack and the other end adjacent the stem in such a position that the key in engaging the stem will move the pawl to inoperative position, a removable cover for the casing, and means for locking the cover in position.

3. In a locking damper regulator, a socket piece adapted to be secured to a damper stem, the socket piece having a lateral arm and a squared projection forming an extension of the stem and adapted to be engaged by a key, a fixed segmental rack concentric with the socket piece, an elongated pawl pivoted to the arm with one end in operative relation to the rack and the other end adjacent the stem in such a position that the key in engaging the stem will move the pawl to inoperative position, and a spring urging the pawl toward engagement with the rack.

In testimony whereof, I hereunto set my hand this 4th day of June, 1920.

JACOB W. GABLE.

In presence of—
BLAIN DUNCAN,
ARTHUR COUGHLIN.